United States Patent [19]
Yatsuka et al.

[11] Patent Number: 5,278,275
[45] Date of Patent: Jan. 11, 1994

[54] POLYURETHANE RESIN COMPOSITION

[75] Inventors: Takeshi Yatsuka; Haruo Asai; Haruhiko Narusawa; Yasunobu Sugyo; Hiroshi Fujimoto, all of Otsu, Japan

[73] Assignee: Toyo Boseki Kabushiki Kaisha, Osaka

[21] Appl. No.: 723,194

[22] Filed: Jun. 28, 1991

[30] Foreign Application Priority Data

Jul. 2, 1990 [JP] Japan ................................ 2-175656
Oct. 16, 1990 [JP] Japan ................................ 2-278028
Nov. 22, 1990 [JP] Japan ................................ 2-320042
Feb. 8, 1991 [JP] Japan ................................ 3-039558
Feb. 15, 1991 [JP] Japan ................................ 3-044147

[51] Int. Cl.$^5$ ........................ C08G 18/70; C08G 18/14
[52] U.S. Cl. ........................................ 528/74; 528/49; 528/905; 521/172; 525/456
[58] Field of Search ................. 528/49, 59, 60, 61, 528/905, 68, 74, 75; 521/163, 172, 177; 525/456

[56] References Cited

U.S. PATENT DOCUMENTS 4,543,369 9/1985 Peerman et al. ....................... 528/75

FOREIGN PATENT DOCUMENTS 1966182 11/1971 Fed. Rep. of Germany .

OTHER PUBLICATIONS

Kenji Seko et al., "Actinic Energy Ray-Curable Composition", Patent Abstracts of Japan, vol. 10, No. 390 (C-394) Dec. 26, 1986, Abstract Only.

Primary Examiner—John Kight, III
Assistant Examiner—Richard Lee Jones
Attorney, Agent, or Firm—Wegner, Cantor, Mueller & Player

[57] ABSTRACT

A polyurethane resin composition containing a polyurethane resin composed of a high molecular weight polyol having a molecular weight of not less than 500, an organic polyisocyanate and optionally a compound having at least 2 active hydrogen-containing groups is disclosed. Not less than 30% by weight of the high molecular weight polyol is a polyester polyol, and the polyester polyol contains at least one tricyclic molecular skeleton in the molecular chain thereof in an amount of not less than 20 mole % based on total acid or glycol components.

15 Claims, No Drawings

POLYURETHANE RESIN COMPOSITION

FIELD OF THE INVENTION

The present invention relates to a polyurethane resin composition comprising a polyurethane resin obtained by copolymerization with a specific tricyclic compound. The polyurethane composition of the present invention is applied to sheet materials such as plastic films, papers, synthetic papers, woven or knitted fabrics, nonwoven fabrics, metal plates and the like to strongly adhere to the materials to provide them with various properties. For example, it can form a coat having excellent heat resistance and light resistance as well as toughness on the surfaces of sheet materials. Further, a coating composition or a coating material obtained by adding finely divided particles such as pigment, magnetic particles, carbon black and the like to the composition of the present invention shows excellent properties as a binder of these finely divided particles.

BACKGROUND OF THE INVENTION

Many of polyurethane resin coating materials are mainly composed of polyurethanes obtained by reacting aliphatic polyester polyols or polyether polyols with organic polyvalent isocyanates, and resins having low glass transition temperatures and large elongation are generally used.

However, recently, demands for coating materials, coating compositions and the like which have high glass transition temperatures and can provide tough coats have been remarkably increased in various fields.

For example, a resin which has a high glass transition temperature, excellent heat resistance and high solubility in solvents as well as a low oligomer content is desired for a back coat layer of a heat sensitive ribbon tape for computers, word processors and the like, a dye-receptor layer or binder or sublimation type heat sensitive recording chart for video color printers, a binder or back coat layer of magnetic recording mediums and the like.

A magnetic tape or floppy disc which is widely used as a recording medium is produced by dispersing acicular magnetic particles having major axes of not more than 1μ together with additives such as dispersing agents, lubricants, antistatic agents and the like into a solution of a binder to make a magnetic coating composition and then applying the resulting composition to a polyethylene terephthalate film to form a magnetic layer.

Examples of the properties required for the binder of the magnetic layer include dispersion properties, filling properties and orientation properties of magnetic particles; durability, wear resistance and heat resistance of the magnetic layer; adhesion properties with a non-magnetic base; and the like, and the binder plays an extremely important role.

Further, a back coat layer provided at the opposite side of the magnetic layer on a non-magnetic base influences on traveling properties of a magnetic tape. Examples of the properties required for a binder of the back coated layer include durability, wear resistance, heat resistance and adhesion properties with the non-magnetic base, and the binder of the back coated layer also plays a extremely important role.

As the binder of the magentic layer or the back coat layer, a mixture of an adipate type or polycaprolactone type polyurethane resin and nitrocellulose or vinyl chloride polymer has mainly been used heretofore.

In a magnetic recording medium, magnetic particles are more micronized and highly filled and oriented in a magnetic layer and the surface of the layer is smoothed to improve s/n ratio (ratio of signal to noise) and to increase memory density. Further, a back coat layer is also smoothed to prevent lowering of the output of a magentic tape due to transfer of unevenness of the back coat layer to a magnetic layer in the case of storing the tape in a rolled state. As the surface of a magnetic layer or back coat layer becomes more smooth, traveling properties and traveling durability of the magnetic tape become more inferior and, therefore, a binder having good durability, wear resistance, heat resistance and adhesion properties with a non-magnetic base has been desired. Conventional binders for magnetic layers or back coat layers are insufficient with respect to these demands.

OBJECTS OF THE INVENTION

One object of the present invention is to provide a polyurethane resin composition having excellent heat resistance and good solubility in a solvent as well as a low oligomer content, which is suitable for a coating material or a binder.

Another object of the present invention is to provide a polyurethane resin composition having improved traveling properties and traveling durability of a magnetic recording medium, which is suitable for a back coat layer of a magnetic recording medium.

Still another object of the present invention is to provide a binder having excellent durability, wear resistance, heat resistance and adhesion properties with a non-magnetic base.

These objects as well as other objects and advantages of the present invention will become apparent to those skilled in the art from the following description.

SUMMARY OF THE INVENTION

According to the present invention, there is provided a polyurethane resin composition which comprises a polyurethane resin composed of a high molecular weight polyol having a molecular weight of not less than 500, an organic polyisocyanate and optionally a compound having at least 2 active hydrogen-containing groups, not less than 30% by weight of said high molecular weight polyol being a polyester polyol, and said polyester polyol containing at least one tricyclic molecular skeleton represented by the formula (I):

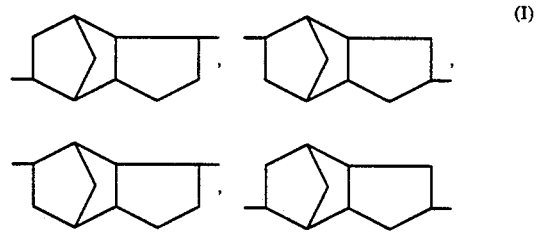

(I)

in the molecular chain thereof in an amount of not less than 20 mole % based on total acid components in the case that the tricyclic molecular skeleton is derived from an acid compound or total glycol components in the case that the tricyclic molecular skeleton is derived from a glycol compound.

DETAILED DESCRIPTION OF THE INVENTION

Examples of the carboxylic acid components of the polyester polyol to be used in the present invention include aromatic dicarboxylic acids such as terephthalic acid, isophthalic acid, orthophthalic acid, 2,6-naphthalic acid, 1,1,3-trimethyl-3-phenylindene-4',5-dicarboxylic acid, 5-sodium sulfoisophthalic acid and the like; aromatic oxycarboxylic acids such as p-(hydroxyethoxy)benzoic acid and the like; aliphatic dicarboxylic acids such as succinic acid, adipic acid, azelaic acid, sebasic acid, dodecane dicarboxylic acid and the like; unsaturated aliphatic and alicyclic dicarboxylic acids such as fumaric acid, maleic acid, tetrahydrophthalic acid, 1,4-cyclohexanedicarboxylic acid and the like; tri and tetracarboxylic acids such as trimellitic acid, pyromellitic acid and the like. Preferably, in these acid components, the amount of the aromatic dicarboxylic acid is at least 70 mole % based on the total acid components and examples of the preferred carboxylic acid include terephthalic acid, isophthalic acid and 1,1,3-trimethyl-3-phenylindene-4',5-dicarboxylic acid.

In the present invention, the polyester polyol contains at least one tricyclic molecular skeleton represented by the formula (I) in the molecular chain thereof as an acid component or a glycol component in an amount of not less than 20 mole % based on total acid component in the case that the tricyclic molecular skeleton is derived from a tricyclic carboxylic acid compound or total glycol components in the case that the tricyclic molecular skeleton is derived from a tricyclic glycol compound. The amount of the tricyclic skeleton represented by the formula (I) is not less than 20 mole %, preferably not less than 30 mole %, more preferably not less than 50 mole % based on the total acid or glycol components. When the amount is less than 20 mole %, the properties such as heat resistance, durability, wear resistance and the like are insufficient.

Examples of the glycol components other than the tricyclic glycol include ethylene glycol, propylene glycol, 1,3-propanediol, 1,4-butanediol, 1,5-pentanediol, 1,6-hexanediol, 1,9-nonanediol, neopantyl glycol, diethylene glycol, dipropylene glycol, 2,2,4-trimethyl-1,3-pentanediol, cyclohexane-dimethanol, 2-butyl-2-ethyl-1,3-propane diol, neopentyl hydroxypivalate, ethylene oxide adduct of bisphenol A, propylene oxide adduct of bisphenol A, ethylene oxide adduct of hydrogenated bisphenol A, propylene oxide adduct of hydrogenated bisphenol A, polyethylene glycol, polypropylene glycol, polytetramethylene glycol and the like. Among the glycol components other than the tricyclic glycol compound, glycols having 8 or more carbon atoms are preferred because they prevent the formation of a cyclic oligomer and can improve durability of the composition as a binder. Examples of the glycols having 8 or more carbon atoms include 1,8-octanediol, 1,9-nonanediol, 2-methyloctanediol, 2,2,4-trimethyl-1,3-pentanediol, dodecanediol, cyclohexanedimethanol, 2-butyl-2-ethyl-1,3-propanediol, neopentyl hydroxypivalate, ethylene oxide adduct of bisphenol A, propylene oxide adduct of bisphenol A, ethylene oxide adduct of hydrogenated bisphenol A, propylene oxide adduct of hydrogenated bisphenol A and the like. Among them, neopentyl hydroxypivalate, cyclohexanedimethanol and nonanediol are preferred and neopentyl hydroxypivalate is particularly preferred.

The molar ratio of the tricyclic carboxylic acid or glycol compound to the other acids or glycols is preferably 4:1 to 1:3, more preferably 3:1 to 1:1. When the amount of the tricyclic compound is larger than the above range, dispersibility of finely divided magnetic particles, carbon black and the like tends to be deteriorated.

Further, compounds having tri or higher functionality such as anhydrous trimellitic acid, glycerin, trimethylolpropane, pentaerythritol or the like can be used as a part of raw materials of the polyester diol in so far as they do not adversely effect on the properties of the polyester resin such as solubility in an organic solvent, coating workability and the like.

The glass transition temperature of the above polyester polyol is preferably 50° to 120° C., more preferably 70° to 120° C. in view of blocking resistance.

In the case of the aromatic polyester polyol, ethylene glycol is preferably used in the amount of not more than 50 mole %, more preferably not more than 30 mole % based on the total glycols of their glycol components. When the amount exceeds 50 mole %, the proportion of the cyclic compounds increases and durability of a magnetic recording medium tends to be deteriorated.

Examples of carboxylic acid components and glycol components of aromatic polyester polyols other than the above include those containing metal sulfonate group such as 5-sodium sulfoisophthalate, 5-potassium sulfoisophthalate, sodium sulfoterephthalate, 2-sodium sulfo-1,4-butanediol, 2,5-diethyl-3-sodium sulfo-2,5-hexanediol and the like. The metal sulfonate group remarkably improves dispersibility of inorganic particles such as magnetic powder, abrasive materials, carbon black and the like.

Examples of the high molecular weight polyol having a molecular weight of not less than 500 other than the above aromatic polyester polyols include aliphatic polyester polyols obtained from aromatic dicarboxylic acids such as succinic acid, adipic acid, azelaic acid, sebasic acid, dodecane dicarboxylic acid and the like and glycol; polylactone polyols such as polycaprolactone, polyvalerolactone and the like; and polyether polyols such as polyethylene glycol, propylene glycol, polytetramethylene glycol and the like; polycarbonate polyols derived from 1,6-hexanediol, neopentyl glycol, cyclohexanedimethanol and the like.

The polyester polyol is used in the amount of not less than 30% by weight, preferably not less than 50% by weight based on the total of the high molecular weight polyols. When the amount is less than 30% by weight, toughness, heat resistance and the like of the resulting polyurethane resin are deteriorated and, thereby, durability of a magnetic recording medium obtained by using the polyurethane resin becomes inferior.

When the above aromatic polyester polyols and the other high molecular weight polyols are used in combination, it is preferred that the difference in glass transition temperatures between them is 80° C. or more, preferably 100° C. or more. When only the aromatic polyester polyol is used as the high molecular weight polyol, it is preferred that the glass transition temperature of the resulting polyurethane resin is not lower than 50° C., preferably not lower than 70° C. When only the aromatic polyester polyol is used as the high molecular weight polyol, it is preferred to add another resin having a lower glass transition temperature other than a polyester so as to adjust flexibility, to improve cold resistance and the like, as described hereinafter.

Examples of the organic diisocyanate of the polyurethane resin used in the present invention include 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 1,5-naphthalene diisocyanate, 2,6-naphthalene diisocyanate, 3,3'-dimethyl-4,4'-diisocyanate, 4,4'-diisocyanate diphenyl ether, 1,5-xylylene diisocyanate, 1,3-diisocyanate methylcyclohexane, 1,4-diisocyanate methylcyclohexane, 4,4'-diisocyanate cyclohexane, 4,4'-diisocyanate cyclohexylmethane, isophorone diisocyanate and the like.

The compound having at least 2 active hydrogen-containing groups to be optionally used has an effect that the concentration of the urethane group in the polyurethane resin can be adjusted to provide characteristic toughness to the polyurethane resin composition. In the case of the compound having tri or higher functionality, it has an effect that reactivity with a curing agent can be enhanced to increase a density of crosslinking. Example of the compound having at least 2 active hydrogen-containing groups include diol compounds such as ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, cyclohexane-dimethanol, neopentyl hydroxypivalate, ethylene oxide adduct of bisphenol A, propylene oxide adduct of bisphenol A, ethylene oxide adduct of hydrogenated bisphenol A, propylene oxide adduct of hydrogenated bisphenol A, polyethylene glycol, tricyclodecanedimethylol and the like; polyol compounds having tri or higher functionality such as trimethylolpropane, glycerin, pentaerythritol, dipentaerythritol and the like; and amines such as ethylenediamine, hexamethylenediamine and the like. They can be used alone or in combination thereof.

When wear resistance, heat resistance and the like are important properties, the molecular weight of the compound having at least 2 active hydrogen-containing groups is preferably less than 500. The compound having a molecular weight of less than 500 has an effect that the concentration of the urethane group can be adjusted to provide the characteristic toughness to the polyurethane resin. However, when the concentration of the urethane group becomes too high, interaction between the polyurethane resins becomes too large, which results in lowering of dispersibility of magnetic particles or carbon black. In view of physical properties of the polyurethane resin per se and properties of a composite coat containing inorganic particles dispersed in the composition of the present invention, it is preferred that the concentration of urethane group in the polyurethane resin is 500 to 4,000 eqivalents, preferably 1,500 to 700 eqivalents, more preferably 1,400 to 1,000 eqivalents per 1 ton of the polyurethane resin.

The molecular weight of the polyurethane resin to be used in the present invention is 5,000 to 80,000, preferably 6,000 to 40,000. When the molecular weight is lower than 5,000, mechanical strength is insufficient and, therefore, traveling durability becomes inferior. When the molecular weight exceeds 80,000, viscosity of a solution of the polyurethane resin becomes high and, therefore, workability as well as dispersibility of magnetic particles, abrasive materials, carbon black and the like become inferior.

In the present invention, it is preferred to add another resin and/or a crosslinking agent to adjust flexibility, to improve cold resistance and heat resistance and the like in addition to the polyurethane resin used in the present invention. Examples of the other resin include vinyl chloride resin, cellulosic resin, polyester resin, epoxy resin, phenoxy resin, polyvinyl butyral, acrylonitrile, butadiene copolymer and the like.

Chemical resistance, solvent resistance and heat resistance can be further improved by addition of a crosslinking agent to crosslink the resin. For this purpose, an organic polyvalent isocyanate compound can be used. Examples of the organic polyvalent isocyanate compounds include burette or isocyanurate trimer of known diisocyanates such as alicyclic diisocyanates (e.g., tetramethylene diisocyanate, hydrogenated tolylene diisocyanate, hydrogenated xylylene diisocyanate, hydrogenated diphenylmethane diisocyanate, etc.), aromatic diisocyanates (e.g., tclylene diisocyanate, xylene diisocyanate, 4,4'-diphenylmethane diisocyanate, etc.) and the like. Adducts of 3 moles of the diisocyanate compound and 1 mole of trifunctional polyol and their blocked isocyanate compounds of which isocyanate groups are blocked can be also used. As the blocking agent of the isocyanate group, for example, there can be used known blocking agent such as phenol, ε-caprolactam, ethyl acetoacetate, methyl ethyl ketoxime and the like. Further, as the alkyl etherified amino-formaldehide resin or epoxy resin can be used for the same purpose. For example, there can be used condensed products of formaldehyde or paraformaldehyde which is alkyl etherified with an alkyl alcohol having 1 to 4 carbon atoms such as methanol, ethanol, n-propanol, isopropanol, n-butanol or the like, with urea, N,N-ethylene urea, dicyanediamide, aminotriazine or the like. For example, there can be used methoxylated methylol urea, methoxylated methylol-N,N-ethylene urea, methoxylate methylol dicyanediamide, methoxylated methylol melamine, methoxylated methylol benzoguanamine, butoxylated methylol melamine, butoxylated methylol benzoguanamine and the like. As the epoxy resin, for example, there can be used known epoxy resins such as diglycidyl ether of bisphenol A and its polymer, diglycidyl ether under bisphenol and its polymer, phenol or cresol novolak type epoxy resin and the like.

The polyurethane resin to be used in the present invention is produced in a solvent at a reaction temperature of 20° to 150° C. in the presence or absence of a catalyst according to a known method. The solvent to be used includes, for example, ketons such as methyl ethyl ketone, ethyl isobutyl ketone, cyclohexanone and the like; aromatic hydrocarbons such as toluene, xylene and the like; and esters such as ethyl acetate, butyl acetate and the like. The catalyst for promoting the reaction includes amines, organic tin compounds and the like.

The resin composition for coating of the present invention is generally used in the form of a solution in which the above polyurethane resin is dissolved in a solvent and the concentration of the solids content is normally about 5 to 70% by weight.

In the polyurethane resin composition of the present invention, if necessary, inorganic finely divided particles such as ferromagnetic magnetic particles, aluminum oxide and the like, extender pigments, color pigments, thixotropic agents, surface smoothening agents, antistatics agents, antifoaming agents, plasticizers, antisegregation agents and the like can be appropriately formulated in addition to the above crosslinking agent according to a particular use.

In the case of using the polyurethane resin composition of the present invention for a binder of a magnetic recording medium, examples of ferromagnetic magnetic particles include ferromagnetic oxides such as $\gamma\text{-Fe}_2\text{O}_3$, mixed crystal of $\gamma\text{-Fe}_2\text{O}_3$ and $\text{Fe}_3\text{O}_4$, $\gamma\text{-Fe}_2\text{O}_3$ or $\text{Fe}_2\text{O}_3$ coated with cobalt, barium ferrite and the like; ferromagnetic alloy powders such as Fe-Co, Fe-Co-Ni and the like.

Further, examples of the inorganic finely divided particles to be used for the back coat layer of a magnetic recording medium include inorganic lubricants such as calcium carbonate, magnesium carbonate, aluminum oxide, chrome dioxide, silicon dioxide, titanium oxide and the like; antistatics agents such as carbon black, tin oxide and the like.

In the polyurethane resin composition of the present invention, if necessary, plasticizers such as dibutyl phthalate, triphenyl phosphate, etc.; lubricants such as dioctyl sodium sulfosuccinate, t-butyl phenol polyethylene ether, sodium ethylnaphthalene sulfonate, dilauryl succinate, zinc stearate, soybean oil lecithine, silicone oil, etc.; various antistatics agents and the like can be further added.

For producing the resin composition for coating, dispersion mixers such as roll mill, blender, ball mill, or the like can be used and methods such as roll coating, gravure-roll coater spray coating, dip coating or the like can be appropriately employed.

reflux condenser. After dissolution of the polyester diol (A), diphenylmethane diisocyanate (24.3 parts) was added thereto. After heating at 80° C. for 2 hours, polyester polyol (B) (50 parts), neopentyl glycol (5 parts), and dibutyltin dilaurate (0.03 part) as a reaction catalyst were added. The reaction was carried out at 80° C. for 6 hours, and then toluene (86 parts) and methyl ethyl ketone (86 parts) were added. The solution of polyurethane resin (1) thus obtained had the solids content of 30% and viscosity at 25° C. of 80 poise.

The properties of the polyurethane resin (1) are shown in Table 1.

Preparations 2 to 6 and Comparative Preparations 1 to 5

Synthesis of polyurethane resin

According to the same manner as that described in Preparation 1, polyurethane resin solutions were prepared from the starting materials shown in Table 1. The properties of the polyurethane resins thus obtained are shown in Table 1.

As seen from Table 1, in Comparative Preparation 1, the amount of tricyclic glycol in the aromatic polyester polyol is 15 mole % based on the total glycol components. In Comparative Preparations 2 and 4, the aromatic polyester polyols contain no tricyclic glycol. In Comparative Preparation 3, the amount of the aromatic polyester polyol containing tricyclic glycol is 30% by weight of high molecular weight polyol. In Comparative Preparation 5, the high molecular weight polyol is copolymerized with adipic acid.

TABLE 1

| Sample | Resin composition (wt ratio) | | | Viscosity at 25° C., poise | Number - average molecular weight |
|---|---|---|---|---|---|
| | Long chain polyol | Glycol | Isocyanate | | |
| Preparation 1 | polyester A 60<br>polyester B 40 | NPG 5 | MDI 24.3 | 80 | 35000 |
| Preparation 2 | polyester A 100 | NPG 5 | MDI 23.3 | 150 | 16000 |
| Preparation 3 | polyester C 80<br>polyester G 20 | NPG 5 | MDI 22.1 | 60 | 28000 |
| Preparation 4 | polyester C 50<br>polyester G 50 | NPG 5 | MDI 22.7 | 32 | 28000 |
| Preparation 5 | polyester D 60<br>polyester B 40 | NPG 5 | MDI 24.3 | 10 | 38000 |
| Preparation 6 | polyester D 100 | NPG 5 | MDI 23.1 | 3 | 12000 |
| | Long chain diol | | | | |
| Comp. Preparation 1 | polyester E 60<br>polyester B 40 | NPG 5 | MDI 22.6 | 40 | 38000 |
| Comp. Preparation 2 | polyester F 50<br>polyester G 50 | NPG 5 | MDI 22.7 | 26 | 28000 |
| Comp. Preparation 3 | polyester C 20<br>polyester G 80 | NPG 5 | MDI 23.3 | 16 | 42000 |
| Comp. Preparation 4 | polyester F 100 | NPG 5 | MDI 20.9 | 85 | 20000 |
| Comp. Preparation 5 | polyester H 100 | NPG 5 | MDI 21.6 | 120 | 41000 |

The following Preparations, Comparative Preparations, Examples and Comparative Examples further illustrate the present invention in detail, but are not to be construed to limit the scope thereof. In the Preparations, Comparative Preparations, Examples and Comparative Examples, all "parts" and "percents" are by weight unless otherwise stated.

The number average molecular weight of the polymer produced was measured by GPC and the polymer composition was analyzed by $^1$H-NMR.

Preparation 1

Synthesis of polyurethane resin

Polyester polyol (A) (50 parts), toluene (65 parts) and methyl ethyl ketone (65 parts) were charged in a reaction vessel equipped with a thermometer, a stirrer and a Abbreviations in Table 1 are as follows:

Polyester A: T/DSN//EG/TCD (97/3//20/80 mole %), MW=2000

Polyester B: polybutylene adipate

Polyester C: T/I/DSN//EG/NPG/TCD (50/48/2//30/30/40 mole %), MW=2500

Polyester D: T//EG/TCD (100//20/80 mole %), MW=2000

Polyester E: T/I/DSN//EG/NPG/TCD (50/48/2//40/45/15 mole %), MW=2500

Polyester F: T/I/DSN//EG/NPG (50/48/2//50/50 mole %), MW=2500

Polyester G: polycaprolactone, MW=2000

Polyester H: T/AA/DSN//EG/NPG (70/28/2//70/30 mole %), MW=2500

T: terephthalic acid; I:isophthalic acid; DSN: 5-sodium sulfoisophthalic acid; EG: ethylene glycol; TCD: tricyclodecane dimethylol (TCD-Alcokol DM, manufactured by Hoechist A.G.)

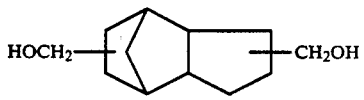

NPG: neopentyl glycol; AA: adipic acid diisocyanate; MDI: 4,4'-diphenylmethane diisocyanate

EXAMPLE 1

A composition of the following formulation was charged in a ball mill and dispersed for 48 hours. Then, Colonate MR (polyisocyanate manufactured by Nippon Polyurethane Kogyo K.K., 0.5 parts) as a curing agent, and stearic acid (0.05 parts) and butyl stearate (0.05 parts) as lubricants were added and the mixture was further kneaded for 1 hour to obtain a magnetic coating composition. This was applied on a polyethylene terephthalate film of 15 μm in thickness so that the thickness of the coat after drying became 4 μm and then dried with applying a magnetic field of 2,000 gauss to produce a magnetic tape. The magnetic tape thus produced was allowed to stand at 60° C. for 1 day and then slit into ½ inch in width. The surface gloss and squareness ratio of the magnetic layer of the resulting tape were determined. The wear state of the magnetic layer after running 100 times on a commercially available VTR deck at 10° C. and 40° C. was observed. Each property is shown in Table 2.

| Formulation | |
|---|---|
| Ingredients | Amount |
| Solution of polyurethane resin obtained in Preparation 1 (30% solution in MEK/toluene = 1/1) | 10 parts |
| Co ferrite magnetic powder (BET: 45 m²/g) | 12 parts |
| Cyclohexanone | 5 parts |
| Toluene | 10 parts |
| MEK | 5 parts |
| Alumina (average particle size: 0.05μ) | 0.5 parts |

EXAMPLES 2 TO 4 AND COMPARATIVE EXAMPLES 1 TO 5

According to the same manner as that described in Example 1, a magnetic tape was produced except that the polyurethane resin described in Table 2 was used in place of the polyurethane resin used in Example 1. Each property is shown in Table 2.

EXAMPLE 5

A composition of the following formulation was charged in a sand mill containing glass beads of 2 mm in diameter and kneaded for 1 hour to disperse the composition. Then, Colonate L (a curing agent manufactured by Nippon Polyurethane Kogyo K.K., 0.5 parts) was added and the mixture was further kneaded for 1 hour to obtain a coating composition for a back coat. This was applied on a polyethylene terephthalate film of 15 μm in thickness so that the thickness of the coat after drying became 0.5 μm and then dried. Then, according to the same manner as that described in Example 1, the magnetic coating composition obtained in Example 1 was applied on the opposite side of the back coat layer of the polyethylene terephthalate film and then dried to obtain a magnetic tape. Then, the magnetic tape was subjected to a curing treatment and slit according to the same manner as that descried in Example 1. A friction coefficient of the back coat surface and a friction coefficient at 20° C. after running 100 times on VTR deck at 40° C. were determined. The results are shown in Table 3.

Determination of the friction coefficient was conducted by providing the magnetic tape with a weight of 100 g and allowed to travel on a patented stainless steel roll of 50 mm in diameter at wrap angles of 180° at a rate of 1 cm/second.

| Formulation | |
|---|---|
| Ingredient | Amount |
| Solution of polyurethane resin obtained in Preparation 5 (30% solution in MEK/toluene = 1/1) | 100 parts |
| Carbon black | 10 parts |
| Calcium carbonate (average particle size: 0.05 μm) | 20 parts |
| Cyclohexanone | 50 parts |
| Toluene | 50 parts |

EXAMPLES 6 TO 7 AND COMPARATIVE EXAMPLES 6 TO 9

According to the same manner as that described in Example 5, a magnetic tape was produced except that the polyurethane resin described in Table 3 was used as a polyurethane resin for back coating. The property is shown in Table 3.

COMPARATIVE EXAMPLE 10

The magnetic tape (no back coat layer) obtained in Example 1 was subjected to the same test as that described in Example 5. The results are shown in Table 3.

TABLE 2

| Sample | Binder | Surface gloss of magnetic layer | Squareness ratio | Wear state of magnetic layer after running | |
|---|---|---|---|---|---|
| | | | | 10° C. | 40° C. |
| Example 1 | polyurethane resin obtained in Preparation 1 | 145 | 0.87 | A | A |
| Example 2 | polyurethane resin obtained in Preparation 2/polyurethane resin (I) = 1/1 | 130 | 0.85 | A | A |
| Example 3 | polyurethane resin obtained in Preparation 3 | 145 | 0.86 | A | A |
| Example 4 | polyurethane resin obtained in Preparation 4 | 140 | 0.86 | A | A |

TABLE 2-continued

| Sample | Binder | Surface gloss of magnetic layer | Squareness ratio | Wear state of magnetic layer after running 10° C. | Wear state of magnetic layer after running 40° C. |
|---|---|---|---|---|---|
| Comp. Example 1 | polyurethane resin obtained in Comparative Preparation 1 | 145 | 0.86 | A | C |
| Comp. Example 2 | polyurethane resin obtained in Comparative Preparation 2 | 140 | 0.86 | A | C |
| Comp. Example 3 | polyurethane resin obtained in Comparative Preparation 3 | 130 | 0.84 | B | C |
| Comp. Example 4 | polyurethane resin obtained in Comparative Preparation 4/ polyurethane resin (I) = 1/1 | 130 | 0.85 | A | C |
| Comp. Example 5 | polyurethane resin obtained in Comparative Preparation 5 | 140 | 0.86 | B | C |

(Note)
Polyurethane resin (I) is polybutylene adipate polyurethane, "Nipporane 2301" manufactured by the Nippon Polyurethane K.K.
Wear state of magnetic layer is evaluated according to the following criteria:
A: no scratch is observed in the magnetic layer
B: Scratchs are observed a little in the magnetic layer
C: Scratchs are remarkably observed in the magnetic layer

TABLE 3

| Sample | Binder for back coating | Friction coefficient of back coat layer Initial | Friction coefficient of back coat layer After running 100 times at 40° C. |
|---|---|---|---|
| Example 5 | polyurethane resin obtained in Preparation 5 | 0.20 | 0.22 |
| Example 6 | polyurethane resin obtained in Preparation 6 | 0.18 | 0.21 |
| Example 7 | polyurethane resin obtained in Preparation 6/polyurethane resin (I) = 2/1 | 0.22 | 0.24 |
| Comp. Example 6 | polyurethane resin obtained in Comp. Preparation 1 | 0.22 | 0.32 |
| Comp. Example 7 | polyurethane resin obtained in Com. Synthetic Example 4 | 0.19 | 0.29 |
| Comp. Example 8 | polyurethane resin obtained in Comp. Preparation 4/ polyurethane resin (I) = 2/1 | 0.26 | 0.37 |
| Comp. Example 9 | polyurethane resin obtained in Comp. Preparation 5 | 0.25 | 0.34 |
| Comp. Example 10 | no back coat | 0.64 | 0.89 |

As is seen from the above results, when the polyurethane resin of the present invention which comprises the aromatic polyester polyol containing the tricyclic glycol in the specific amount is used as the binder of magnetic particles and a binder of the back coat layer, wear resistance is improved and change of the friction coefficient becomes small. As a result, a magnetic recording medium having excellent running durability can be obtained.

Preparation 7

Synthesis of polyurethane resin

Polyester polyol (I) (50 parts), polyester polyol (J) (50 parts) and toluene (80 parts) as shown in Table 4 were charged in a reaction vessel equipped with a thermometer, a stirrer, a reflux condenser and a distillation column. After dissolution, toluene (20 parts) was distilled off and the reaction system was dehydrated by azeotropy of toluene and water. After cooling to 60° C., diphenylmethane diisocyanate (15.6 parts) was added to the reaction vessel. After heating at 80° C. for 2 hours, methyl ethyl ketone (60 parts), trimethylolpropane (2 parts) and dibutyltin dilaurate (0.03 parts) as a reaction catalyst were added. The mixture was reacted at 80° C. for 6 hours and then toluene (77.2 parts) and methyl ethyl ketone (77.2 parts) were added to obtain a polyurethane resin (7) having the solids content of 30%. The properties of the polyurethane resin (1) are shown in Table 4. In Table 4, the viscosity was determined at 25° C. and the number-average molecular weight was determined in a tetrahydrofuran solution according to gel permeation chromatography.

Preparations 8 to 12

Synthesis of polyurethane resin

According to the same manner as that described in Preparation 7, a polyurethane resin solution was obtained from the starting materials shown in Table 4. The properties of the resulting polyurethane resin are shown in Table 4.

TABLE 4

| Sample | Resin composition (weight ratio) Long chain polyol | Resin composition (weight ratio) Low molecular weight polyol | Resin composition (weight ratio) Diisocyanate | Viscosity at 25° C., poise | Number - average molecular weight |
|---|---|---|---|---|---|
| Preparation 7 | polyester A 50 polyester B 50 | TMP 2 | MDI 15.8 | 18 | 29000 |
| Preparation 8 | polyester A 100 | — | MDI 12.2 | 81 | 31000 |
| Preparation 9 | polyester A 40 polyester A 60 | NPG 3 | MDI 19.3 | 40 | 39000 |
| Preparation 10 | polyester D 100 | TMP-CL 6 | MDI 13.0 | 9.3 | 18000 |
| Preparation 11 | polyester D 70 polyester B 30 | TMP-CL 6 | MDI 13.0 | 19 | 28000 |
| Preparation 12 | polyester E 100 | — | MDI 15.7 | 53 | 19000 |

Abbreviations in Table 4 are as follows:
Polyester composition and Molecular weight
Polyester I: T/I/DSN//EG/TCD/HPN (50/47/3//20/50/30 mole %), MW=2000
Polyester J: polybutylene adipate, MW=2000
Polyester K: polycaprolactone, MW=2000
Polyester L: T/I/DSN//EG/TCD/1,9-ND (50/47/3//10/60/30 mole %), MW=3000

Polyester M: T/DSN//TCD/HPN (98/2//50/50 mole %), MW=1500

T: terephthalic acid; I: isophthalic acid; DSN: 5-sodium sulfoisophthalic acid; EG: ethylene glycol; TCD: tricyclodecane dimethylol; HPN: neopentyl hydroxybivarate; 1,9-ND: 1,9-nonanediol; NPG: neopentyl glycol Low molecular weight polyol
TMP: trimethylol propane
NPG: neopentyl glycol
TMP-CL: TMP-ε-caprolactone adduct (molecular weight: 390)
Diisocyanate
MDI: 4,4'-diphenylmethane diisocyanate

EXAMPLE 8

A composition of the following formulation was charged in a ball mill and dispersed for 48 hours. Then, a polyisocyanate compound, Colonate MR (manufactured by Nippon Polyurethane Kogyo K.K.; 0.5 parts) as a curing agent and stearic acid (0.05 parts) as a lubricant were added. The mixture was further kneaded for 1 hour to obtain a magnetic coating composition. This was applied on a polyethylene terephthalate film of 15 μm in thickness so that the thickness of the coating after drying became 4 μm and then dried with applying a magnetic field of 2000 gauss to make a magnetic tape. The magnetic tape thus obtained was allowed to stand at 60° C. for 1 day and then slit into ½ inch in width. The surface gloss and squareness ratio of the magnetic layer of the resulting tape were determined. The wear state of the magnetic layer after running 100 times on a commercially available VTR deck at 10° C. and 40° C. was observed. The properties are shown in Table 5 below.

| Formulation | |
|---|---|
| Ingredient | Amount |
| Solution of polyurethane resin obtained in Preparation 7 (30% solution in MEK/toluene = 1/1) | 10 parts |
| Metallic magnetic powder (BET 50 m²/g) | 15 parts |
| Cyclohexanone | 5 parts |
| Toluene | 10 parts |
| MEK | 5 parts |
| Alumina (average particle size: 0.05μ) | 0.5 parts |

EXAMPLES 9 TO 12

According to the same manner as that described in Example 8, a magnetic tape was produced except that the polyurethane resin shown in Table 5 was used. The properties are shown in Table 5.

EXAMPLE 13

A composition of the following formulation was charged in a sand grinder containing glass beads of 2 mm in diameter and dispersed for 1 hour. Then, Colonate L (manufactured by Nippon Polyurethane Kogyo K.K.; 0.5 parts) as a curing agent was added and the mixture was further kneaded for 1 hour to obtain a coating composition for back coating. This was applied on a polyethylene terephthalate film of 15 μm in thickness so that the thickness of the coating after drying became 0.5 μm and then dried. Then, according to the same manner as that described in Example 8, the magnetic coating composition obtained in Example 8 was applied on the opposite side of the back coat layer of the polyethylene terephthalate film and then dried to obtain a magnetic tape. After the magnetic tape was subjected to a curing treatment and slit according to the same manner as that described in Example 8, the friction coefficient of the back coat surface and the friction coefficient at 20° C. after running 100 times on VTR deck at 40° C. were determined. The results are shown in Table 6.

Determination of the friction coefficient was conducted by the same manner as described above.

| Formulation | |
|---|---|
| Ingredient | Amount |
| Solution of polyurethane resin obtained in Preparation 12 (30% solution in MEK/toluene = 1/1) | 100 parts |
| Carbon black | 10 parts |
| Calcium carbonate (average particle size: 0.05 μm) | 20 parts |
| Cyclohexanone | 50 parts |
| Toluene | 50 parts |

EXAMPLES 14 TO 16

According to the same manner as that described in Example 13, a magnetic tape was produced except that the polyurethane resin shown in Table 6 was used. The properties are shown in Table 6.

TABLE 5

| Sample | Binder (resin/ magnetic particles = 1/4) | Surface gloss of magnetic layer | Squareness ratio | Wear state of magnetic layer after running | |
|---|---|---|---|---|---|
| | | | | 10° C. | 40° C. |
| Example 8 | polyurethane resin obtained in Preparation 7 | 142 | 0.86 | A | A |
| Example 9 | polyurethane resin obtained in Preparation 8/polyurethane resin (Z) = 1/1 | 130 | 0.85 | A | A |
| Example 10 | polyurethane resin obtained in Preparation 9 | 135 | 0.86 | A | A |
| Example 11 | polyurethane resin obtained in Preparation 10/polyurethane resin (Z) = 1/1 | 135 | 0.86 | A | A-B |
| Example 12 | polyurethane resin obtained in Preparation 11 | 140 | 0.86 | A | A |
| Example 13 | polyurethane resin obtained in Preparation 12/poly- | 143 | 0.87 | A | A |

TABLE 5-continued

| Sample | Binder (resin/ magnetic particles = 1/4) | Surface gloss of magnetic layer | Square-ness ratio | Wear state of magnetic layer after running 10° C. | 40° C. |
|---|---|---|---|---|---|
| | urethane resin (Z) = 1/1 | | | | |

(Note)
Polyurethane resin (Z) is polybutylene adipate polyurethane, Nipporane 2301" manufactured by the Nippon Polyurethane K.K.
Wear state of magnetic layer is evaluated as described in Table 2.

TABLE 6

| | | Friction coefficient of back coat layer | |
|---|---|---|---|
| Sample | Binder for back coating | initial | running after 100 times at 40° C. |
| Example 14 | polyurethane resin obtained in Preparation 7 | 0.20 | 0.22 |
| Example 15 | polyurethane resin obtained in Preparation 11 | 0.18 | 0.19 |
| Example 16 | polyurethane resin obtained in Preparation 12/poly-urethane resin (Z) = 2/1 | 0.21 | 0.22 |

Preparation 13
Production of polyester polyol

Dimethyl terephthalate (388 parts), dimethyl isophthalate (376 parts), anhydrous trimellitic acid (12 parts), tricyclodecane dimethylol (706 parts), neopentyl glycol (541 parts) and tetrabutoxy titanate (0.5 parts) were charged in a reaction vessel equipped with a thermometer and a stirrer and heated at 150° to 220° C. for 240 hours to proceed an ester interchange reaction. After the temperature of the reaction system was raised to 250° C. over 30 minutes, the pressure of the system was gradually reduced to 10 mmHg over 45 minutes. The reaction was continued for additional 1 hour to obtain a pale yellow and transparent polyester polyol (O). The resin thus obtained had the number-average molecular weight of 4,000.

According to the same manner, polyester polyols (P) to (S) were obtained. They are shown in Table 7 below.

Production of polyester resin

According to the same formulation as the polyester polyol (Q) shown in Table 7, an ester interchange reaction was conducted and a polycondensation reaction was conducted for 120 minutes at not higher than 0.3 mmHg to obtain a pale yellow and transparent polyester resin (T). The resin thus obtained had the number-average molecular weight of 17,000 and the glass transition temperature of 64.2° C.

Preparation 14
Production of polyurethane resin

The polyester polyol (O) having the number-average molecular weight of 4,000 obtained in Preparation 13 (100 parts) and toluene (100 parts) were charged in a reaction vessel equipped with a thermometer, a stirrer and a reflux condenser and the mixture was dissolved. Then, neopentyl glycol (9 parts), isophorone diisocyanate (22.3 parts) and dibutyltin laurate (0.02 parts) were charged in the reaction vessel to proceed the reaction at 70° to 100° C. for 4 hours. After the reaction system was cooled to 70° C., methyl ethyl ketone (153.2 parts) and toluene (53.2 parts) were added to terminate the reaction.

The polyurethane resin (U-1) thus obtained had the number-average molecular weight of 18,000 and the glass transition temperature of 98° C. According to the same manner, polyurethane resins (U-2) to (U-7) were obtained. They are shown in Table 8 below.

TABLE 7

| Polyester polyol | Acid components (mole %) | | | Alcohol components (mole %) | | | | Number - average molecular weight |
|---|---|---|---|---|---|---|---|---|
| | Terephthalic acid | Isophthalic acid | Trimellitic acid | Neopentyl glycol | Tricyclodecane dimethylol | Ethylene glycol | Diethylene glycol | |
| O | 50 | 48 | 2 | 10 | 90 | — | — | 4000 |
| P | 50 | 48 | 2 | 50 | 50 | — | — | 6000 |
| Q | 50 | 50 | — | 50 | — | 50 | — | 2000 |
| R | 50 | 48 | 2 | — | 50 | — | 50 | 4000 |
| S | 50 | 49 | 1 | 10 | 90 | — | — | 2000 |

TABLE 8

| Poly-urethane resin | Polyester polyol (100 parts) | Organic diisocyanate | | Chain extender | | | Number - average molecular weight | Glass transition temperature (°C.) | Concentration of urethane group (eq./10⁶g) |
|---|---|---|---|---|---|---|---|---|---|
| | | Isophorone isocyanate (parts) | Hexamethylene diisocyanate (parts) | Neopentyl glycol (parts) | Hydroxyneo-pentyl bivalate (parts) | Diethylene glycol (parts) | | | |
| U-1 | O | 22.3 | — | 9 | — | — | 18,000 | 98.0 | 1,550 |
| U-2 | O | 22.5 | — | — | — | 9 | 20,000 | 99.0 | 1,540 |
| U-3 | S | 9.6 | — | — | — | — | 17,000 | 94.0 | 780 |
| U-4 | P | 27.3 | — | 10 | — | — | 20,000 | 97.1 | 1,790 |
| U-5 | O | 60.8 | — | 30 | — | — | 19,000 | 91.4 | 2,870 |
| U-6 | R | 22.5 | — | 9 | — | — | 18,000 | 65.0 | 1,550 |
| U-7 | Q | — | 12.5 | — | 5 | — | 6,000 | 48.0 | 1,500 |

Evaluation method of printed image

A receptor sheet and a heat transfer sheet were laminated each other so that a dyed layer (dye-receptor layer) was brought into contact with a coloring material layer. By using a thermal head, the laminate was heated from the base side of the heat transfer sheet under conditions of an output of the head of 0.7 W/dot, a head heating time of 8 mS and a dot density of 3 dots/mm to transfer a cyanogen color and magenta color in the color material layer to the dyed layer. The concentration of the printed image thus obtained was measured by a reflection density measuring apparatus (manufactured by Dainippon Screen K. K.: DM-600).

Evaluation method of light resistance

A receptor sheet wherein a cyanogen color and magenta color had been transferred was irradiated at 40° C. with a xenon lamp so that the energy provided by the xenon lamp became 67.0 KJ/m². Light resistance was expressed by the following retention of dye concentration (%) in which comparison was made with the concentration before light resistance test.

Retention of dye concentration (%) =

$$\frac{\text{concentration before light resistance test}}{\text{concentration after light resistance test}} \times 100$$

Evaluation method of blocking resistance

A receptor layer and a base paper were laminated each other and allowed to stand for 24 hours at pressure of 5 gf/cm². Then, whether a blocking phenomenon was arisen or not was observed. Blocking resistance was evaluated according to the following criteria.

Good: No change was observed at the surface of the receptor after peeling and it could be easily peeled off.

Inferior: Blocking was arisen and it was difficult to peel off.

Evaluation method of heat resistance (dark discoloration)

A receptor wherein a cyanogen color and magenta color had been transferred was allowed to stand under an atomosphere of dark place at 60° C. for 168 hours to conduct aging. Heat resistance was expressed by the retention of dye concentrtaion (%) in which comparison was made with the concentration before heat resistance.

EXAMPLE 17

A polyurethane resin (U-1) for a receptor layer was diluted with a mixed solvent (toluene/methyl ethyl ketone=50/50) to obtain a 20% solution. Epoxy modified silicone oil (manufactured by Shinetsu Kagaku K. K.: KF-102) was added to the solution in an amount of 10% by weight based on the resin. Then, it was applied on a synthetic paper (manufactured by Oji Yuka K. K.: Yupo PPG-150) of 150 μm in thickness using a wire bar so that a dried coating of 4 μm in thickness was obtained. The above sheet was dried in an atmosphere of 120° C. for 30 minutes to obtain a dyed layer (dye-receptor layer). The evaluation results are shown in Table 9 below.

EXAMPLES 18 TO 22

By using polyurethane resins (U-2) to (U-6), a dyed layer was formed according to the same manner as that described in Example 17. The evaluation results are shown in Table 9.

COMPARATIVE EXAMPLE 11

By using a polyurethane resin (L), a dyed layer was formed according to the same manner as that described in Example 17. The results are shown in Table 9.

COMPARATIVE EXAMPLE 12

By using a polyester resin (T) containing no urethane group, a dyed layer was formed according to the same manner as that described in Example 17. The results are shown in Table 9.

TABLE 9

| | Concentration of printed image | Light resistance (%) | Blocking resistance | Heat resistance (%) |
| --- | --- | --- | --- | --- |
| Example 17 | 2.0 | 97 | good | 96 |
| Example 18 | 1.9 | 96 | good | 96 |
| Example 19 | 1.8 | 93 | good | 94 |
| Example 20 | 1.9 | 95 | good | 95 |
| Example 21 | 1.7 | 90 | good | 92 |
| Example 22 | 1.8 | 96 | inferior | 93 |
| Com. Example 11 | 1.5 | 70 | inferior | 65 |
| Com. Example 12 | 1.4 | 65 | inferior | 63 |

As is clear from Table 9, in the polyurethane resin of the present invention, the concentration of printed image is high, and light resistance and heat resistance are extremely excellent.

EXAMPLE 23

According to the same manner as that described in Preparation 13, a polyester polyol (V) having the comosition of terephthalic acid/trimellitic acid//neopentyl glycol/TCD glycol/(=50/48/2//10/90), the number-average molecular weight of 4,000 and the glass transition temperature of 85° C. was obtained. According to the same manner as that described in Preparation 14, a polyurethane resin (U-8) having the number-average molecular weight of 18,000 and the glass transition temperature of 98° C. was obtained. By using this polyurethane resin (U-8), a dyed layer was formed according to the same manner as that described in Example 17. The concentration of printed image, light resistance, blocking resistance, heat resistance and image stability were evaluated.

Evaluation of image stability

A receptor wherein cyanogen color dye had been transferred was allowed to stand under conditions of dark place at 60° C. for 1 week to conduct aging. After aging, printed dots were observed using a 40-fold magnifying glass and evalutated according to the following criteria.

Inferior: Dye was apparently spreaded into a space between the printed dots and it showed a spreaded state.

Good: No change was found in comparison with the state immediately after printing and the printed dots was confirmed.

Comparative Example 13

For comparison, a polyester resin having the composition of terephthalic acid/isophthalic acid/trimellitic acid/sebasic acid//neopentyl glycol/TCD glycol (=35/35/2/30//10/90 mole ratio), the number-average molecular weight of 18,000 and the glass transition temperature of 33° C. was evaluated. The results are shown in Table 10.

TABLE 10

| | Concentration of printed image | Light resistance (%) | Heat resistance (%) | Image stability |
| --- | --- | --- | --- | --- |
| Example 23 | 2.2 | 94 | 100 | good |
| Comp. Example 13 | 2.1 | 80 | 78 | inferior |

EXAMPLES 23 TO 27 AND COMPARATIVE EXAMPLES 14 TO 15

According to the same manner as that described in Preparation 13, polyester polyols (W), (X) and (Q) were obtained and, according to the same manner as that described in Preparation 14, polyurethane resins (U-9) to (U-13) as shown in Table 12 were produced. By using these polyurethane resins and the above polyester resin (T), dyed layers were formed according to the same manner as that described in Example 17. The concentration of printed image, light resistance, heat resistance and resistance for remaining a trace of a fingerprint (fingerprint resistance) were evaluated.

EVALUATION OF FINGERPRINT RESISTANCE

The thumb was strongly push against the surface of a receptor wherein cyanogen color dye had been transferred to remain a trace of the fingerprint on the surface of the image. Then, the receptor was allowed to stand under conditions at 40° C. for 48 hours. Agglomeration of cyanogen color dye, stripping and remaining of a trace of the fingerprint were observed and evaluated according to the following criteria.

A: After aging, there were no trace of the fingerprint on the surface of the receptor layer and no color change.

B: After aging, there was no color change, but a trace of the fingerprint was remained.

C: After aging, the dye was agglomerated on the surface of the image. The results are shown in Table 13.

The results of Table 13 show that fingerprint resistance is improved by using polyethylene glycol having ether group and active hydrogen-containing group as a chain extender.

TABLE 11

| Polyester polyol | Acid Components | | | Alcohol Components | | | Number - average molecular weight |
|---|---|---|---|---|---|---|---|
| | Terephthalic acid | Isophthalic acid | Trimellitic acid | Neopentyl glycol | Tricyclodecane dimethylol | Ethylene glycol | |
| W | 50 | 48 | 2 | 10 | 90 | — | 4000 |
| X | 50 | 48 | 2 | 50 | 50 | — | 6000 |
| Q | 50 | 50 | — | 50 | — | 50 | 2000 |

TABLE 12

| Polyurethane resin | Polyester polyol (100 parts) | Organic diisocyanate | | Chain extender | | | | Number - average molecular weight | Glass transition temperature (°C.) | Concentration of urethane group (eq./10$^6$g) |
|---|---|---|---|---|---|---|---|---|---|---|
| | | Isophorone isocyanate | Hexamethylene diisocyanate | PEG #400 | PEG #300 | PEG #1000 | NPG | | | |
| | | (parts) | | (parts) | | | | | | |
| U-9 | W | 20.4 | — | 30 | — | — | — | 35,000 | 45.0 | 1,200 |
| U-10 | W | 13.4 | — | 16 | — | — | — | 37,000 | 72.0 | 931 |
| U-11 | W | 35.4 | — | — | 30 | — | — | 30,000 | 69.0 | 1930 |
| U-12 | X | 10.7 | — | 10 | — | 2 | — | 38,000 | 48.1 | 790 |
| U-13 | Q | — | 12.5 | — | — | — | 5 | 6,000 | 48.4 | 1,500 |

NPG: Neopentyl glycol, PEG #400: Polyethylene glycol having a molecular weight of about 400, PEG #300: Polyethylene glycol having a molecular weight of about 300, PEG #1000: Polyethylene glycol having a molecular weight of about 1,000

TABLE 13

| | Concentration of printed image | Light resistance (%) | Heat resistance (%) | Fingerprint resistance |
|---|---|---|---|---|
| Example 24 | 2.2 | 95 | 100 | A |
| Example 25 | 2.0 | 93 | 98 | B |
| Example 26 | 2.1 | 94 | 99 | B |
| Example 27 | 2.2 | 93 | 100 | B |
| Comp. Example 14 | 1.4 | 65 | 63 | C |

TABLE 13-continued

| | Concentration of printed image | Light resistance (%) | Heat resistance (%) | Fingerprint resistance |
|---|---|---|---|---|
| Comp. Example 15 | 1.5 | 65 | 65 | C |

What is claimed is:

1. A polyurethane resin composition which comprises a polyurethane resin that is the reaction product of a number average high molecular weight polyol having a molecular weight of at least 500, an organic polyisocyanate and optionally a compound having at least 2 active hydrogen-containing groups, at least 30% by weight of said high molecular weight polyol being a polyester polyol whose main acid component is an aromatic dicarboxylic acid, said polyester polyol containing at least one tricyclic molecular skeleton derived from an acid compound or a glycol compound and represented by the formula (I):

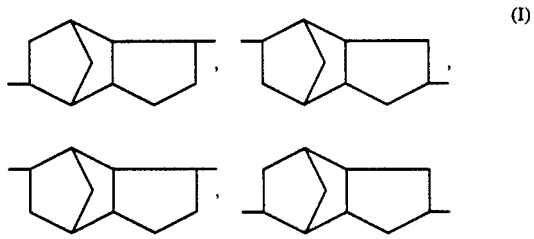

in the molecular chain thereof in an amount of at least 20 mole % based on (i) total acid component in the case that the tricyclic molecular skeleton is derived from an acid compound or (ii) total glycol components in the case that the tricyclic molecular skeleton is derived from a glycol compound and the glass transition temperature of said polyester polyol is at least 40°.

2. A polyurethane resin composition according to claim 1, wherein the polyester polyol contains at least one tricyclic glycol having the tricyclic molecular skeleton of the formula (I) in an amount of 20 mole % based on the total glycol components.

3. A polyurethane resin composition according to claim 1, wherein the compound containing active hydrogen groups is glycol.

4. A polyurethane resin composition according to claim 2, wherein the compound having at least 2 active hydrogen-containing groups is a di, tri or tetra functional compound having a number average molecular weight of less than 500.

5. A polyurethane resin composition according to claim 4, wherein at least 30 mole % of the glycol components of the polyester polyol is a tricyclic glycol having the molecular skeleton of the group of the formula (I).

6. A polyurethane resin composition according to claim 1, wherein the glass transition temperature of the polyester polyol is 50° to 120° C.

7. A polyurethane resin composition according to claim 6, wherein the high molecular weight polyol is a mixture of a polyester diol and a polyol other than the polyester diol and the difference in the glass transition temperatures between the polyester diol and the high molecular weight polyol other than the polyester diol is at least 80° C.

8. A polyurethane resin composition according to claim 5, wherein the glycol component of the polyester polyol contains a glycol having 8 or more carbon atoms in addition to the tricyclic glycol having the molecular skeleton of the formula (I).

9. A polyurethane resin composition according to claim 8, wherein the molar ratio of the tricyclic glycol having the molecular skeleton of the formula (I) to the glycol having 8 or more carbon atoms is 4:1 to 1:3.

10. A polyurethane resin composition according to claim 9, wherein ethylene glycol is contained in addition to the tricyclic glycol having the skeleton of the formula (I) and the glycol having 8 or more carbon atoms, and the amount of ethylene glycol is at most 50 mole % based on the total glycol components.

11. A polyurethane resin composition according to claim 6, wherein the number-average molecular weight of the polyurethane resin is 5,000 to 80,000 and a concentration of urethane bond in the polyurethane resin is 500 to 4,000 equivalent/$10^6$ g.

12. A polyurethane resin composition according to claim 11, wherein the polyurethane resin has an ionic polar group and a concentration of urethane bond is 700 to 1,500 equivalent/$10^6$ g.

13. A polyurethane resin composition according to claim 11, which contains a crosslinking agent for polyurethane resins.

14. A polyurethane resin composition according to claim 13, wherein the crosslinking agent is at least one compound selected from the group consisting of polyisocyanate compounds, polyepoxy compounds and alkyl etherified amino-formaldehyde resins.

15. A polyurethane resin compound according to claim 14, which contains at least one type of inorganic particles selected from the group consisting of magnetic particles, pigments, carbon black and inorganic lubricants.

* * * * *